Figure 1:
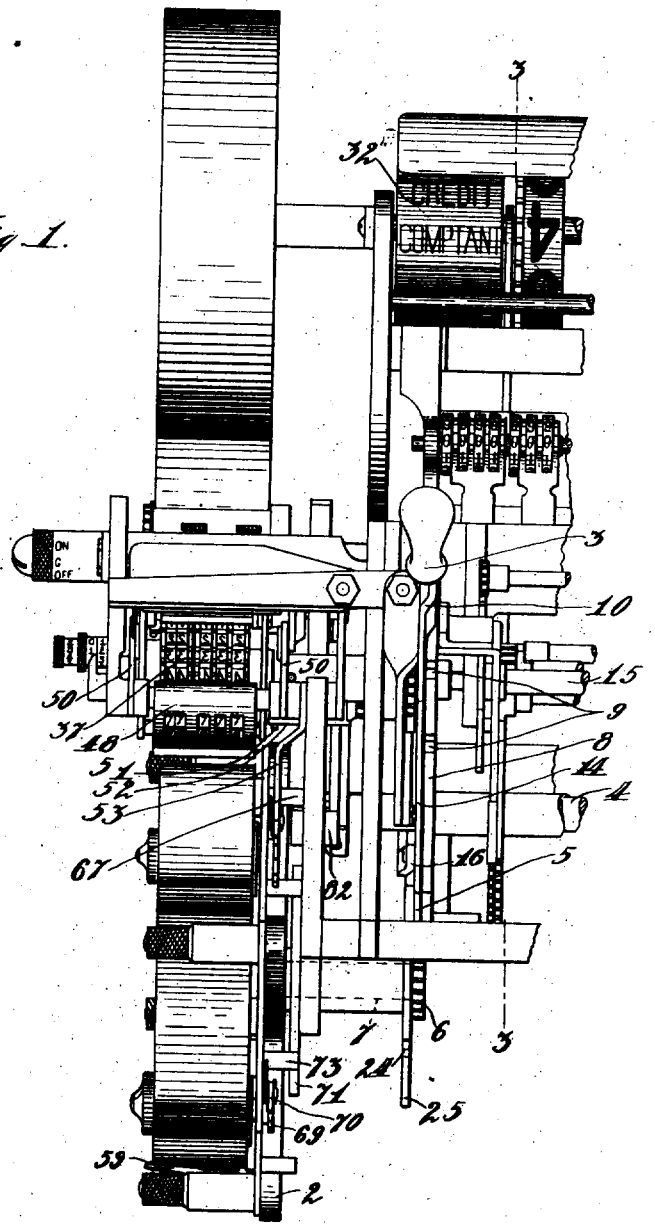

T. CARROLL.
CASH REGISTER.
APPLICATION FILED OCT. 5, 1904.

973,754.

Patented Oct. 25, 1910.
4 SHEETS—SHEET 2.

Witnesses
Wm. O. Henderson

Inventor
Thomas Carroll
Frank Parker Davis
+ J. B. Hayward
Attorneys

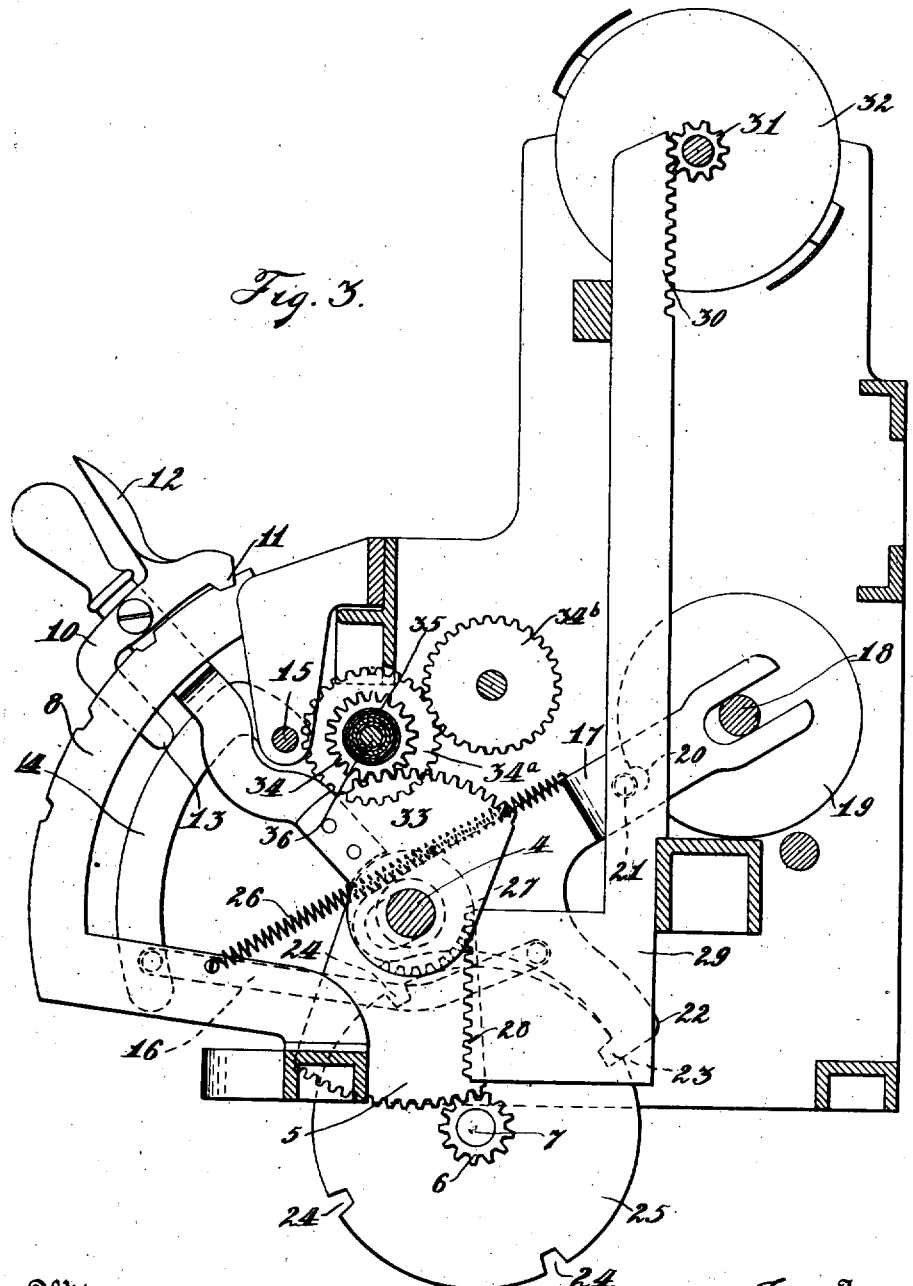

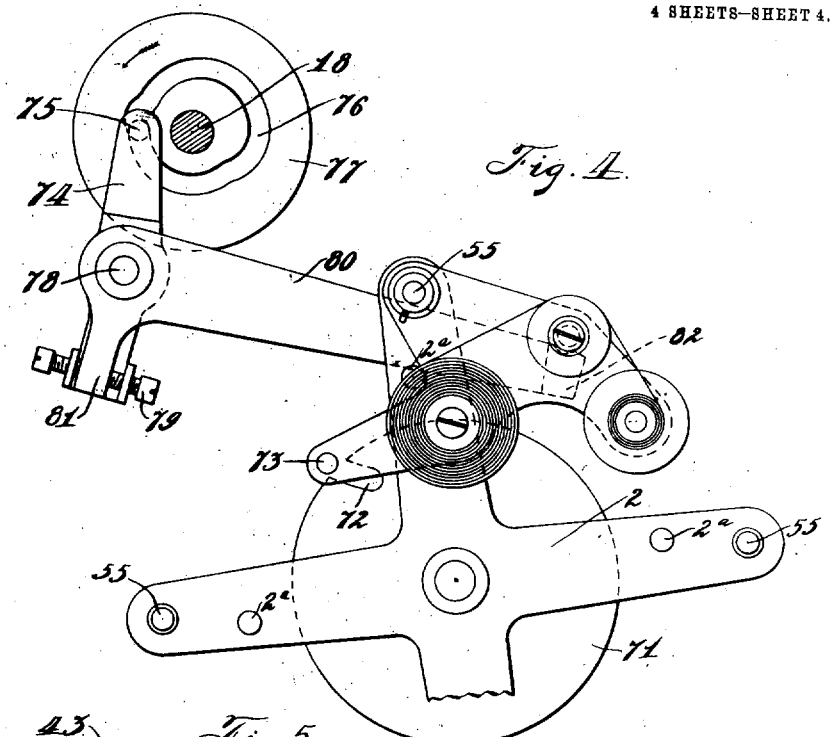
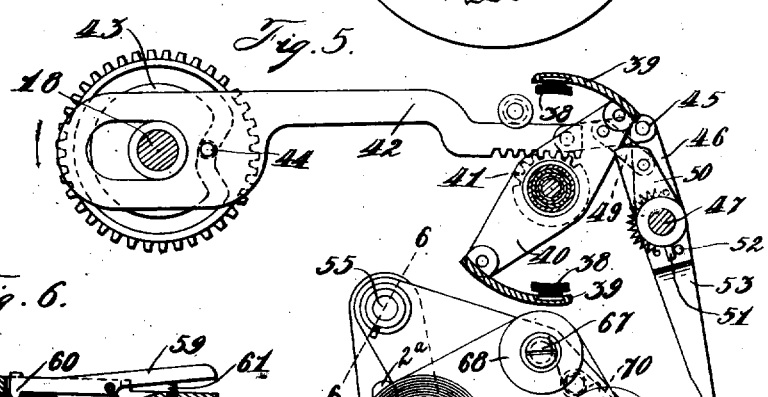
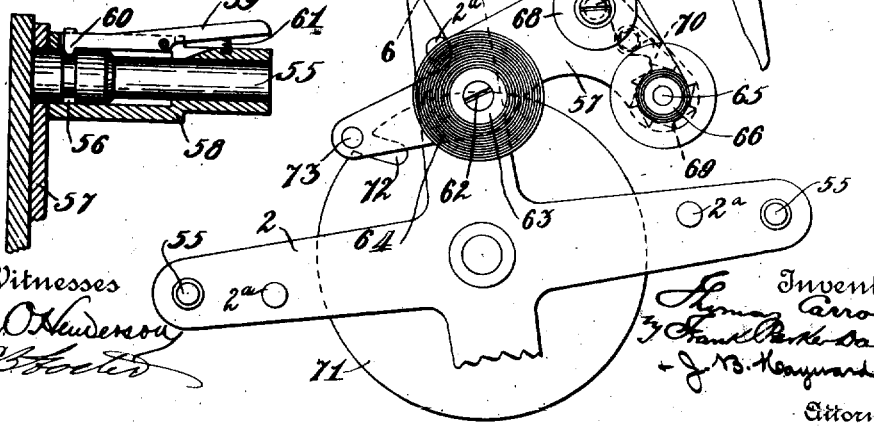

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO (INCORPORATED IN 1906).

CASH-REGISTER.

973,754.     Specification of Letters Patent.     Patented Oct. 25, 1910.

Application filed October 5, 1904. Serial No. 227,320.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates more particularly to that type of machine in which a plurality of accounting devices are employed so that a segregated analysis of transactions can be preserved. It is common to accomplish this by employing a plurality of counters and arranging for one or another being brought into coöperative relation with the operating mechanism of the cash register and it is also common to employ a plurality of paper strips or a single strip divided into columns.

The present invention relates more particularly to that class of these machines which employs a plurality of paper strips one for each clerk or one for each character of transaction and the invention may be said to constitute an improvement upon the construction shown in patent to Thomas Carroll #654,226 of July 24, 1900. In this patent a reel carrying a plurality of paper strips is shown in connection with the type of machine illustrated in Cleal and Reinhard Patent #580,378, dated April 13, 1897, whereas in the present case the invention is shown in connection with the type of machine shown in Thomas Carroll Patent No. 751,611, dated Feb. 9, 1904. It is to be understood however that the invention may be embodied in the type of machine shown in the first named patent or in various other types of cash registers.

One object of the present invention is to obviate the necessity of the carrier itself being moved to do the printing as in Patent #654,226. Instead the various strip holders are movably mounted upon the carrier so that they can be individually operated to do the printing without requiring any movement of the carrier. The latter can thus be simply journaled upon a fixed support and the machine relieved of the extra work of raising and lowering the entire carrier in each operation.

Other objects of the invention are to provide against any independent movement of the strip carriers except when positioned for coöperation with the type; and to provide strip feeding devices which will coöperate with each strip holder when in juxtarelation to the type and be inoperative to effect any feed except when the movement of the strip holder is that which does the printing, it being understood that in this class of machines it is common to have a double movement of one member of the printing couple so as to provide for pressing the inking devices against the type preliminary to printing.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Figure 2:
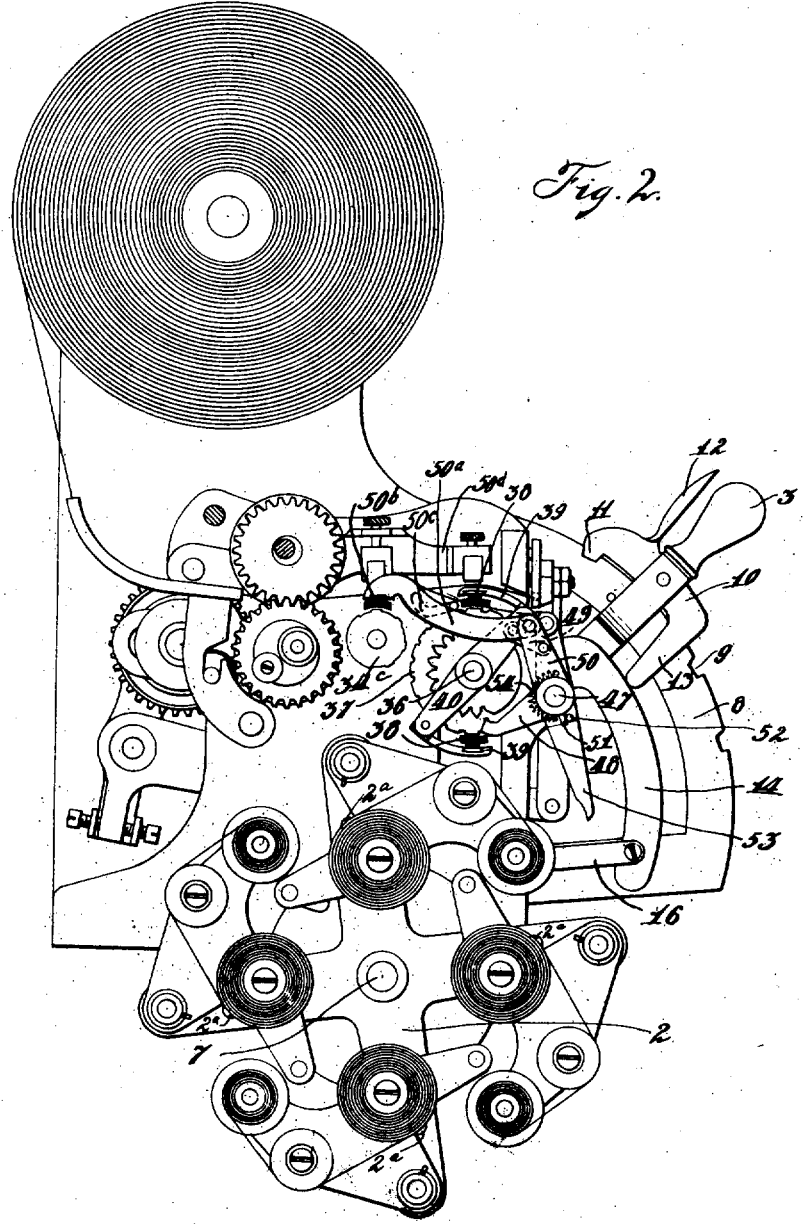

Of said drawings: Figure 1 represents a portion of a cash register in front elevation with the present improvements applied thereto and the casing or cabinet omitted. Fig. 2 represents the machine in side elevation also with the cabinet omitted. Fig. 3 is a view looking from the opposite side as compared with Fig. 2, this view being taken on the line 3—3 of Fig. 1 but a number of parts being omitted for clearness. Fig. 4 is a fragmentary side elevation on an enlarged scale as compared with Fig. 2 showing part of the rotary carrier and one of the strip holders together with the strip printing actuator. Fig. 5 is a similar view to Fig. 4 in so far as the rotary carrier and strip holder are concerned but shows also partly in section and partly in side elevation the inking devices and strip feeding mechanism. Fig. 6 is a detail sectional view of a strip holder and part of the rotary carrier, this view being taken on a line 6—6 of Fig. 5.

It will not be necessary to enter into a detailed description of the cash register mechanism, that is to say: the differential means for effecting a registration according to adjustments of the manipulative amount determining devices. In the character of machines to which the improvements are shown applied in the present case the setting up of amounts and special characters is done by the adjustment of levers which move up and down along suitable scales.

The special transaction lever is designated by the numeral 3 and is journaled upon a fixed cross shaft 4 (Fig. 3) and carries a toothed segment 5 which is in mesh with a pinion 6 on a shaft 7 journaled in a suitable bearing upon the base of the machine frame and on the outer side of the latter carrying a spider 2 which in the present instance has four arms. This spider is the rotary carrier for the strip holders and it will be seen that vibrations of the lever 3 will rotate the carrier. Said lever moves along a bar 8 having four notches 9 in its outer edge and the lever carries a latch 10 having a nose 11 for engagement with one or another of these notches. The latch also has a finger piece 12 extending alongside of the hand lever 3 and a tail piece 13 which bears against a curved lever 14 pivoted at 15 to a bracket of the frame (Fig. 3). This curved lever 14 is connected by a link 16 with a slide 17 which is slotted to embrace the shaft 4 and forked to embrace a rotation shaft 18 of the cash register, which shaft carries a disk 19 having a semi-circular notch 20 adapted to be engaged by a pin 21 on the slide 17. The latter has a downwardly extending arm 22 with a nose 23 for engagement with any one of four notches 24 in a disk 25 which is fixed on the shaft 7. A spring 26 is secured at one end to the slide 17 and at the other to the machine frame and exerts itself to draw the slide forward and hence move the lever 14 outwardly. This in turn tends to press the latch nose 11 into any notch of the bar 8 opposite which said nose may stand. With this nose engaged in one of said notches the spring 26 is enabled to hold the nose 23 of the slide 17 in engagement with one of the notches 24 of the disk 25, the pin 21 in this case being withdrawn from the notch 20.

It will be seen that by squeezing the finger 12 in connection with the grasp on the handle 3 the latch 10 will be rocked withdrawing its nose 11 from the notch 9 and pressing its tail 13 against the lever 14 thereby forcing the slide 17 rearwardly against the tension of its spring 26 and withdrawing its nose 23 from the disk 25. This operation unlocks the rotary carrier or spider 2 but simultaneously locks operating mechanism of the cash register by engaging the pin 21 with the notch 20 so that no operation of the rotary crank handle of the cash register can take place so long as the nose of the latch is disengaged from one of the notches. This insures the proper adjustment of the rotary carrier and special transaction lever before any operation of the cash register can ensue. The special transaction lever also carries a toothed segment 27 which engages a rack 28 on a slide 29 which at its upper end has a rack 30 engaging a pinion 31 of an indicator roller 32 for displaying a name or other sign which will show the adjustment at which the machine is set. The lever carries a third segment 33 in mesh with a pinion 34 secured to the outermost one of a series of nested sleeves 35. This outermost sleeve carries another gear $34^a$ in mesh with a gear $34^b$ on the shaft of a printing drum $34^c$ for printing special transaction indicia on a check. The other sleeves and the shaft 36 on which they are mounted carry type wheels 37 of a well known form (Fig. 1) one of which is shown also in Fig. 2. Any lines of type which are set up by adjustment of these wheels will be supplied with ink by pads 38 carried by curved plates 39 pivotally supported between the opposite extremities of arms 40 one of which is journaled upon the shaft 36 and the other upon the outermost of the nested sleeves which support type wheels 37. A segment 41 (Fig. 5) is compounded with the inner one of these arms and meshes with a rack 42 which at its rear end straddles the rotation shaft 18, the latter carrying a box cam 43 engaging a roller-equipped pin 44 on the rack so that in the course of revolution of the shaft 18 in an operation of the machine the inking structure will be rocked at the proper times first to withdraw the inking pads from over the printing lines and subsequently to restore them. A link 45 connects the rack 42 with an arm 46 secured to a shaft 47 to which alining pawls 48 are secured so that when the ink pads are swung away from the printing lines the alining pawls will be brought into engagement with the printing wheels to hold them in proper alinement for printing. The arms 40 carrying the ink pad plates 39 are connected by short links 49 with arms 50 loosely mounted on the shaft 47 and coupled to side arms of a frame $50^a$ which carries an ink pad $50^b$ for the printing drum $34^c$ said frame being guided in its movements by a slot and pin connection with the frame work as indicated at $50^c$. The hub of one of the arms 50 carries a projecting pin 51 for engagement with a pin 52 projecting laterally from a long pawl 53 also loosely mounted on the shaft 47 and drawn rearwardly by a spiral spring 54 which is secured at one end to the arm 50 and at the other end to the pawl. The latter constitutes part of a strip feeding mechanism which will hereinafter be more fully described.

The mechanism for feeding the check strip and cutting the same into checks (which mechanism appears in Fig. 2) need not be described as it forms no part of the present invention and is well known. The same may be said of the upper platen $50^d$ except that it is made double for coöperation with both the printing roller $34^c$ and the type wheels 37 but this is a feature of Patent No. 792,194 granted June 13/05.

Reverting to the rotary carrier 2 each of its arms is provided with a projecting pin or stud 55 which is formed with a circumferential groove 56 (Fig. 6) and each one of these studs is designed to receive and support one of the strip holders. Each of the latter comprises an angular plate 57 having a sleeve formation 58 to fit over the stud 55. This sleeve is longitudinally slotted to receive a latch 59 having at one end a nose 60 to engage the groove 56 of the stud and its opposite end forced outwardly by a spiral spring 61 inserted between it and the sleeve 58. The stud 55 has a beveled shoulder and the nose 60 is rounded so that in slipping the holder plate on to the stud it will be automatically caught and held, the beveled shoulder causing the latch to rock against the pressure of the spring 61 and the nose 60 thereafter being forced into the groove 56 by said spring. The stud 55 forms the pivot for the holder and the latter carries three other shafts or studs one of which 62 supports a supply roll 63 for the paper strip 64 and another of which 65 is journaled in a bearing on the plate and supports a take-up roll 66 for said strip, the remaining stud 67 supporting an impression roller 68 of rubber or other resilent material. The roller 66 has compounded with it a ratchet wheel 69 which is engaged by a restraining pawl 70 to prevent any backward movement and is adapted to be operated by the long pawl 53 heretofore described. Stop pins 2ª on the spider limit movement of the strip holders in one direction.

There is fixed on the side of the framework a circular disk 71 with a slot 72 at one point and each one of the strip holders has at one end a laterally projecting pin 73 which when the holder is adjusted for coöperation with the type wheels stands opposite said notch 72 while the pins of all the other holders lie against the periphery of the fixed disk 71. It will be seen that this prevents any rocking movement of any strip holder except the particular one which is adjusted so that its projecting pin 73 may traverse the slot.

The construction for effecting an upward movement of the adjusted holder on its pivot remains to be described and this comprises a two-part bell crank lever one arm 74 of which (Fig. 4) has a pin 75 engaging the groove 76 of a box cam 77 fixed to the rotation shaft 18. This arm of the bell crank lever has an extension on the lower side of the pivot 78 which extension is flanged to receive adjusting screws 79. The other arm 80 of the bell crank lever has a downward extension 81 lying between these adjusting screws 79. The arm 80 is the longer one of the two arms of the bell crank and at its forward end is formed with a lateral projection 82 having a V-shaped groove in its upper side. The stud 67 of each strip holder projects on the inner side of the holder for coöperation with this lateral extension 82 on the bell crank arm 80. When a strip holder is adjusted for coöperation with the type wheels its stud 67 lies directly over this lateral extension 82 so that in any upward movement of the bell crank arm 80 the strip holder will be rocked on its pivot. The box cam groove 76 has two cam projections, one lower than the other, so that in a rotation of the shaft 18 two differential vibrations will be given the bell crank lever.

The operation of the machine is as follows: Assuming the crank handle (not shown) to be home which will place the notch 20 of the disk 19 opposite the pin 21 of the slide 17, the lever 3 is grasped and with it the finger 12 of the latch 10 and the latter disengaged from the notch 9 which has the effect as before explained of unlocking the rotary carrier or reel. Then by moving the lever 3 along the scale it can be brought opposite the name or sign indicating the character of transaction to be made and the release of the latch 10 causes the nose 11 to engage the proper notch 9 and at the same time the reel is locked by the nose 23 on the slide 17 engaging one of the notches 24 of the disk 25 and the operating mechanism of the cash register is unlocked by the withdrawal of pin 21 from notch 20. This adjustment of the lever turns the reel 2 bringing the proper one of the strip holders into coöperative relation with the type wheels, that is to say, in such relation that the impression roller 68 of this particular strip holder is in juxta-position to the lower line of type of the wheels 37. The first turning of the crank handle causes a high portion of the box cam 77 to vibrate the bell crank lever and the arm 80 acting against the stud of the impression roller rocks the strip holder upwardly on its pivot and thereby causes the impression roller to act against the lower ink pad plate 39. The impression roller then retreats and the box-cam 43 moves the rack 42 and thereby withdraws the inking pads from the printing lines. At the same time the alining pawls 48 are moved into engagement with the printing wheels so as to hold them stationary and preserve the alinement. The swinging of the inking structure acting through the links 49 rocks the arms 50 and the pin 51 carried by one of these arms is thus moved rearwardly and is followed up by the long pawl 53. This brings the nose of that pawl immediately above one of the teeth of the ratchet 69. The strip holder is again moved upwardly under the impulse of the higher part of the box cam 77 and the consequent bodily movement of the ratchet 69 causes it to be turned the extent of one tooth by reason of the encounter with the nose of the long pawl 53 but as the upward movement continues the contacting tooth escapes past the nose of the pawl and then the impression is made. After the retreat of the strip carrier the inking pads again move to position over the lines of type from which the impression has been made and the consequent rocking of the arm 50 causes the pin 51 carried by one of these arms to move the pawl 53 entirely out of the range of movement of any parts of the rotary carrier. This leaves the carrier free to be rotated so far as any obstruction offered by this pawl is concerned.

It will be seen that the above described construction is well calculated to thoroughly fulfil the objects primarily stated, and it is to be understood that it is not desired to confine the invention to the one form of embodiment here disclosed, for it is susceptible of embodiment in various forms all coming within the scope of the claims which follow.

Having thus described my invention, what I claim as new and desire to secure by Letters Patent is:

1. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier.

2. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier; and means for preventing such independent movement of any strip holder when out of juxta-relation to the type.

3. In a cash register, the combination with suitable type; of a rotatable carrier and a plurality of strip holders movably mounted thereon, any one of which holders can be juxta-positioned with relation to the type by adjustment of said carrier; together with means for effecting the imprint by movement of the strip holder independently of the carrier.

4. In a cash register, the combination with suitable type; of a rotatable carrier and a plurality of strip holders movably mounted thereon, any one of which holders can be juxta-positioned with relation to the type by adjustment of said carrier; together with means for effecting the imprint by movement of the strip holder independently of the carrier; and a circular track with which a part of each strip holder runs in contact to prevent such independent movement of any holder, unless juxta-positioned with relation to the type, the said track having a break in it substantially as and for the purpose described.

5. In a cash register, the combination with suitable type; of an adjustable carrier and a plurality of strip holders pivotally mounted thereon, any one of which holders can be juxta-positioned with relation to the type by adjustment of said carrier; together with means for effecting the imprint by movement of the strip holder independently of the carrier.

6. In a cash register, the combination with suitable type; of a rotatable carrier and a plurality of strip holders pivotally mounted thereon, any one of which holders can be juxta-positioned with relation to the type by adjustment of said carrier; together with means for effecting the imprint by movement of the strip holder independently of the carrier.

7. In a cash register, the combination with suitable type; of a rotatable carrier and a plurality of strip holders pivotally mounted thereon, any one of which holders can be juxta-positioned with relation to the type by adjustment of said carrier; together with means for effecting the imprint by movement of the strip holder independently of the carrier; and a circular track with which a part of each strip holder runs in contact to prevent such independent movement of any holder, unless juxta-positioned with relation to the type, the said track having a break in it substantially as and for the purpose described.

8. In a cash register, the combination with suitable type; of a rotatable carrier and a plurality of strip holders pivotally mounted thereon, each holder being constructed to present the strip to the type to one side of its pivot and having a lateral projection in the other side of its pivot; a circular track on which the lateral projections of the holders run to prevent movement on their pivots, said track having a break to permit such movement of any holder juxta-positioned with relation to the type; and means for causing an imprint by pivotal movement of the juxta-positioned holder.

9. In a cash register, the combination with suitable type; of an adjustable carrier and a plurality of strip holders movably mounted thereon, any one of which holders can be juxta-positioned with relation to the type by adjustment of said carrier; together with a vibratory arm into coöperative relation with which comes the strip holder when juxta-positioned relatively to the type.

10. In a cash register, the combination with suitable type; of an adjustable carrier and a plurality of strip holders movably mounted thereon, any one of which holders can be juxta-positioned with relation to the type by adjustment of said carrier, and each holder having a lateral projection; together with a vibratory arm having a lateral projection for coöperation with the projection of the adjusted holder to cause an imprint substantially as described.

11. In a cash register, the combination with suitable type; of a rotatable carrier and a plurality of strip holders pivotally mounted thereon; together with a vibratory arm into coöperative relation with which comes the strip holder when juxta-positioned relatively to the type.

12. In a cash register, the combination with suitable type; of a rotatable carrier and a plurality of strip holders pivotally mounted thereon, and each holder having a lateral projection; together with a vibratory arm having a lateral projection for coöperation with the projection of the adjusted holder to cause an imprint substantially as described.

13. In a cash register, the combination with suitable type; of an adjustable carrier and a plurality of strip holders movably mounted thereon and detachable therefrom, any one of which holders can be juxta-positioned with relation to the type by adjustment of said carrier; together with means for effecting the imprint by movement of the strip holder independently of the carrier.

14. In a cash register, the combination with suitable type; of an adjustable carrier and a plurality of strip holders pivotally mounted thereon and detachable therefrom, any one of which holders can be juxta-positioned with relation to the type by adjustment of said carrier; together with means for effecting the imprint by movement of the strip holder independently of the carrier.

15. In a cash register, the combination with suitable type; of an adjustable carrier having a plurality of pivot studs circumferentially grooved, strip-carriers with sleeve bearings to embrace said studs and latches to engage the grooves thereof, and means for rocking any one of said holders juxta-positioned with relation to the type substantially as and for the purpose described.

16. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier; and means for feeding the strip by such movement of the holder.

17. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier; and means for feeding the strip by such movement of the holder, with provisions for discontinuing the feed prior to the taking of the impression.

18. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier; and means for feeding the strip by such movement of the holder, with provisions for maintaining the feed mechanism disabled during adjustment of the carrier.

19. In a cash register, the combination with suitable type; of an adjustable carrier and a plurality of strip holders movably mounted thereon, any one of which holders can be juxta-positioned with relation to the type by adjustment of said carrier; together with means for effecting the imprint by movement of the strip holder independently of the carrier; and means for feeding the strip by such movement of the holder, with provisions for maintaining the parts of the feed mechanism out of operative alinement during adjustment of the carrier.

20. In a cash register, the combination with suitable type, and shiftable inking means, of an adjustable carrier, a plurality of strip holders movably mounted thereon and each having a strip-feeding element, and a coöperating strip feeding element mounted on a fixed part of the machine and controlled in its operative relation to any strip-feeding element of the holder by the inking means.

21. In a cash register, the combination with suitable type, and shiftable inking means, of an adjustable carrier, a plurality of strip holders movably mounted thereon and each having a strip-feeding take-up roll equipped with a ratchet wheel, and a coöperating pawl pivotally mounted on a fixed part of the machine and spring-pressed in a direction to engage the ratchets of the strip holders, and means connected with the shiftable inking means for holding said pawl out of operative alinement with any of said ratchets.

22. In a cash register, the combination of a rotatable carrier for a plurality of accounting devices, an adjustable hand-lever geared to said carrier and equipped with a latch, a notched disk compounded with the carrier, and a latch for said disk connected with the handle latch.

23. In a cash register, the combination with suitable type and a strip feeding device; of a movable carriage; a series of detail strip holders movably mounted on said carriage; means for adjusting said carriage to move any one of said strip holders to a desired printing and feeding line; and means for moving the adjusted holder to effect the printing and feeding.

24. In a cash register, the combination with a printing mechanism; of a movable carriage; a series of movable strip holders movably mounted on said carriage; mechanism for adjusting said carriage to bring any desired one of said holders into coöperative relation with the printing mechanism; means for moving the adjusted holder to take an impression from the printing mechanism; and means for locking the holders out of such adjustment against movement while permitting printing movement of the adjusted holder.

25. In a cash register, the combination with suitable type, of a series of detail strip winding rollers; a strip feeding pawl; and means for automatically throwing said pawl into and out of coöperative feeding relation with any one of said rollers upon the operation of the machine.

26. In a cash register, the combination with suitable type, of a detail strip holder; means for moving said holder to carry the strip against the type; a strip feeding element for feeding said strip upon the movement of said holder; and means for automatically throwing said strip feeding element into and out of coöperative feeding relation upon the operation of the machine.

27. In a cash register, the combination with suitable type, of a detail strip holder; an inking device for said type; a strip feeding element connected with said inking device; and means for automatically throwing said feeding element into feeding position when the inking device is thrown out of inking position.

28. In a cash register, the combination with suitable type, of a detail strip holder; an inking device for said type; a strip feeding element connected with said inking device; means for moving said strip holder to first carry the same against the inking device to ink the type and then carry the same against the type to take the impression; and means for automatically moving the inking device out of inking position prior to the impression movement of the detail strip holder, and for also simultaneously moving the strip feeding element into operative position to feed the strip as an accompaniment to the impression movement of the strip holder.

29. In a cash register, the combination with printing devices, of a movable carriage, a series of record holders each including a feeding ratchet mounted on said carriage, means for moving any one of said record holders to cause an impression by said printing devices on said operated record, a pawl for actuating the ratchet appropriate to the operated record holder and means for moving the same into and out of the path of the said ratchet.

30. In a cash register, the combination with printing devices, of means for supporting a series of record material holders and separate feeding means for each of said holders, means for moving said supporting means to cause an impression to be made on any one of said records, a feeding pawl and means for moving same at each operation of the machine into and out of the path of the feeding means.

31. In a cash register, the combination with a carriage, of a pin having a groove mounted on said carriage, a support for a record material, a sleeve forming part of said support and adapted to surround said pin and a pawl carried by said sleeve and having a point adapted to engage in said groove.

32. In a cash register, the combination with suitable type, of a movable carriage; a record strip holder movably mounted on said carriage; means for adjusting said carriage to bring said strip holder to a desired printing line; mechanism for moving the holder against the type when in printing line; and means for preventing the movement of said holder when out of such printing line.

33. In a cash register, the combination with a printing mechanism, of a movable carriage; a plurality of record strip holders mounted on said carriage; a single strip feeding mechanism common to the holders; means for adjusting said carriage to establish a coöperative relation between one of the holders and the printing and feeding mechanisms; and a single means for effecting such printing and feeding operation.

34. In a cash register, the combination with a plurality of record strip holders; of a single strip feeding mechanism common to all of said holders; means for establishing a coöperative relation between said feeding mechanism and one of said holders; and means for effecting the feeding operation by a movement of the holder.

35. In a cash register, the combination with a movable carriage; of a series of record strip holders movably mounted on said carriage; a single strip feeding mechanism common to all of said holders; means for adjusting said carriage to establish a coöperative relation between said feeding mechanism and any one of said movable holders; and means for effecting the feeding operation by a movement of the holder.

36. In a cash register, the combination with a movable carriage; of a series of record strip holders movably mounted on said carriage; a single strip feeding mechanism common to all of said holders; means for adjusting said carriage to establish a coöperative relation between said feeding mechanism and any one of said movable holders; and means for effecting the feeding operation by a movement of the holder independent of the carriage.

37. In an accounting machine, the combination with a type-carrier, of a plurality of record strip holders, a carriage upon which said holders are mounted, means for moving said carriage to bring any one of the strip holders into coöperative relation with the type-carrier, and means for taking an impression upon the strip holder that is in coöperative relation with the type-carrier independently of movement by the carriage.

38. In an accounting machine, the combination with an operating mechanism, of a type-carrier, a plurality of record strip holders, a carriage upon which said holders are mounted, means for moving said carriage to bring any one of the strip holders into coöperative relation with the type-carrier, and means for taking an impression upon the strip holder that is in coöperative relation with the type-carrier and locking the carriage from movement while the machine is being operated.

39. In an accounting machine, the combination with a type-carrier, of a plurality of record strip holders, a carriage upon which said holders are mounted, means for moving said carriage to bring any one of the strip holders into coöperative relation with the type-carrier, a feeding device common to all of the strip holders, and means for taking an impression and feeding the strip holder that is in coöperative relation with the type-carrier independently of movement by the carriage.

40. In an accounting machine, the combination with an operating mechanism, of a type-carrier, a plurality of record strip holders, a carriage upon which said strip holders are mounted, an adjustable lever for moving said carriage to bring any one of the strip holders into coöperative relation with the type-carrier, a feeding device common to all of the strip holders, and means for taking an impression and feeding the strip holder that is in coöperative relation with the type carrier, and locking the carriage from movement while the machine is being operated.

41. In an accounting machine, the combination with a type-carrier of a plurality of record strip holders, a carriage upon which said holders are mounted, means for moving said carriage to bring any one of the strip holders into coöperative relation with the type-carrier, a feeding device common to all of the strip holders, an inking device for the type-carrier, and means for operating the inking and feeding devices and taking an impression upon the strip holder that is in coöperative relation with the type-carrier independently of movement by the carriage.

In testimony whereof I affix my signature in the presence of two witnesses.

THOMAS CARROLL.

Witnesses:
WM. O. HENDERSON,
CARL W. BEUST.